(12) United States Patent
Yamada

(10) Patent No.: US 9,199,157 B2
(45) Date of Patent: Dec. 1, 2015

(54) TRACK STRUCTURE FOR SKATEBOARD

(75) Inventor: Tsutomu Yamada, Chigasaki (JP)

(73) Assignee: SURPATH TRADING CO., LTD., Gigasaki-shi (JP)

( * ) Notice: Subject to any disclaimer, the term of this patent is extended or adjusted under 35 U.S.C. 154(b) by 152 days.

(21) Appl. No.: 13/639,174

(22) PCT Filed: Apr. 15, 2010

(86) PCT No.: PCT/JP2010/002760
§ 371 (c)(1),
(2), (4) Date: Oct. 3, 2012

(87) PCT Pub. No.: WO2011/128944
PCT Pub. Date: Oct. 20, 2011

(65) Prior Publication Data
US 2013/0069331 A1    Mar. 21, 2013

(51) Int. Cl.
*A63C 17/00* (2006.01)
*B60G 9/02* (2006.01)
*A63C 17/01* (2006.01)

(52) U.S. Cl.
CPC ............ *A63C 17/0093* (2013.01); *A63C 17/012* (2013.01); *A63C 17/015* (2013.01); *B60G 9/02* (2013.01)

(58) Field of Classification Search
None
See application file for complete search history.

(56) References Cited

U.S. PATENT DOCUMENTS

| 6,315,304 | B1 | 11/2001 | Kirkland et al. |
| 6,547,262 | B1 * | 4/2003 | Yamada et al. ............ 280/11.28 |
| 6,979,007 | B1 | 12/2005 | Hosoda |
| 2002/0011713 | A1 | 1/2002 | Kirkland |
| 2007/0164530 | A1 | 7/2007 | Horn |

FOREIGN PATENT DOCUMENTS

| DE | 10 2004 045 464 B3 | 3/2006 |
| EP | 1391225 A1 | 2/2004 |
| JP | 1-144080 U | 10/1989 |
| JP | 5-277221 A | 10/1993 |
| JP | 10-127853 A | 5/1998 |
| JP | 10-184049 A | 7/1998 |

(Continued)

OTHER PUBLICATIONS

International Search Report of PCT/JP2010/002760, date of mailing Jun. 22, 2010.

(Continued)

*Primary Examiner* — John Walters
*Assistant Examiner* — Hilary L Johns
(74) *Attorney, Agent, or Firm* — Westerman, Hattori, Daniels & Adrian, LLP

(57) ABSTRACT

A track structure is provided with a bearing containing chamber having a pivotable attachment section composed of a recess which is formed in one of a support base or a rockable section and is open to the other; an operation section formed on the other of the support base or the rockable section and rotatably fitted in the bearing containing chamber; a pivot shaft section for rotatably supporting the operation section within the bearing containing chamber; and elastic blocks arranged in plural within the bearing containing chamber at equal intervals about the axis of the pivot shaft section, the elastic blocks holding the operation section at the neutral position and, when the operation section pivots to right and left, biasing the operation section in a direction in which the operation section returns to the neutral position.

15 Claims, 5 Drawing Sheets

(56) References Cited

FOREIGN PATENT DOCUMENTS

| | | | |
|---|---|---|---|
| JP | 11-197289 A | 7/1999 | |
| JP | 2000-24163 A | 1/2000 | |
| JP | 2001-62023 A | 3/2001 | |
| JP | 2001-87552 A | 4/2001 | |
| JP | 2001-299956 A | 10/2001 | |
| JP | 2004-81757 A | 3/2004 | |
| JP | 4268393 B2 | 5/2009 | |
| WO | 01/30465 A1 | 5/2001 | |

OTHER PUBLICATIONS

Supplementary European Search Report dated Jan. 27, 2015, issued in counterpart Patent Application No. 10 84 9785 (2 pages).

* cited by examiner

TRACK STRUCTURE FOR SKATEBOARD

TECHNICAL FIELD

The present invention relates to a track structure for a skateboard and particularly to improvement of the track structure which can return a wheel to a neutral position by using an elastic block in a steering operation for automatically returning the wheel by body weight shifting.

BACKGROUND ART

As a prior-art example of a track structure for a skateboard, a track mounting fitting for a skateboard as in Patent Laid-Open No. 2001-62023, for example, is disclosed.

Since a pivot structure is used in the above-described configuration, a range of following-up by body weight shifting is small, and thus, sufficient rocking and automatic return were difficult.

Thus, as a structure for rocking largely to right and left by pivotally attaching a track section to a support tool and by using a spring capable of returning to a neutral position, a track structure for a skateboard as in Japanese Patent No. 4268393, for example, is known.

Since turning is made by the support tool during turning such that a top face of a cylindrical base section and a side peripheral face are covered by a cap-shaped receiving section in the above-described configuration, there is no concern of damage even if an external force is applied in a direction other than the turning and stable turning can be performed. Moreover, since a link piece is only pivotally attached to a projecting shaft projected on an upper face of the base section and an adjustment bolt, configuration is simple and excellent in reliability.

On the other hand, in the above-described configuration, since a coil spring is fitted in an accommodation section of a support disk so as to regulate a rotation range by the link piece pivotally supported by the projecting shaft, a large coil spring is required, and if a large impact or a load is applied from the outside to the coil spring or the link piece, there is a concern of damage and breakage.

CITATION LIST

Patent Literature

PTL 1: Japanese Patent Laid-Open No. 2001-62023
PTL 2: Japanese Patent No. 4268393

SUMMARY OF INVENTION

Technical Problem

The present invention was made in view of the above circumstances and has an object to provide a track structure for a skateboard which can automatically return a wheel by body weight shifting in a steering operation by directly bringing an elastic block into contact with an operation section at a pivotable attachment spot.

Means for Solving the Problem

In order to solve the above-described problems, the present invention is characterized by having, in a track structure for a skateboard composed of a support base which is fixed to a deck and a rockable section pivotally attached to the support base and has a track section and provided with a pivotable attachment section which supports the rockable section turnable from a neutral position of the track section to right and left and also biases it capable of returning to the neutral position, a bearing containing chamber having a pivotable attachment section composed of a recess which is formed in one of the support base and the rockable section and which is open toward the other;

an operation section formed on the other of the support base and the rockable section and rotatably fitted in the bearing containing chamber and composed of a columnar block;

a pivot shaft section for rotatably supporting, within the bearing containing chamber, the operation section; and elastic blocks hooked by a plurality of corner sections formed within the bearing containing chamber, capable of replacement, and arranged in plural at equal intervals about the axis of the pivot shaft section, wherein a most protruding center of the arc-shape formed on the distal end facing the operation section of each of the elastic blocks is arranged to abut each side wall surface of the operation section at the center at the neutral position of the operation section;

the plurality of elastic blocks hold said operation section at the neutral position and, when the operation section pivots to right and left from the neutral position, bias the operation section in a direction in which the operation section returns to the neutral position by deflecting the elastic blocks, capable of repulsion.

Advantages of the Invention

In the track structure for a skateboard of this invention, a force applied to a track section generated by body weight shifting moves the rockable section and displaces also the operation section.

By the displacement of the operation section, the elastic blocks are compressed, and a repulsive force to a returning direction is raised, and a steering angle can be automatically returned.

Since the elastic block can be built in a gap of the bearing containing chamber, the structure does not increase in volume and can avoid influences by external impacts and weather.

Moreover, since they are only contained and hooked in the bearing containing chamber, replacement is easy, and convenience is high.

Figure 1:
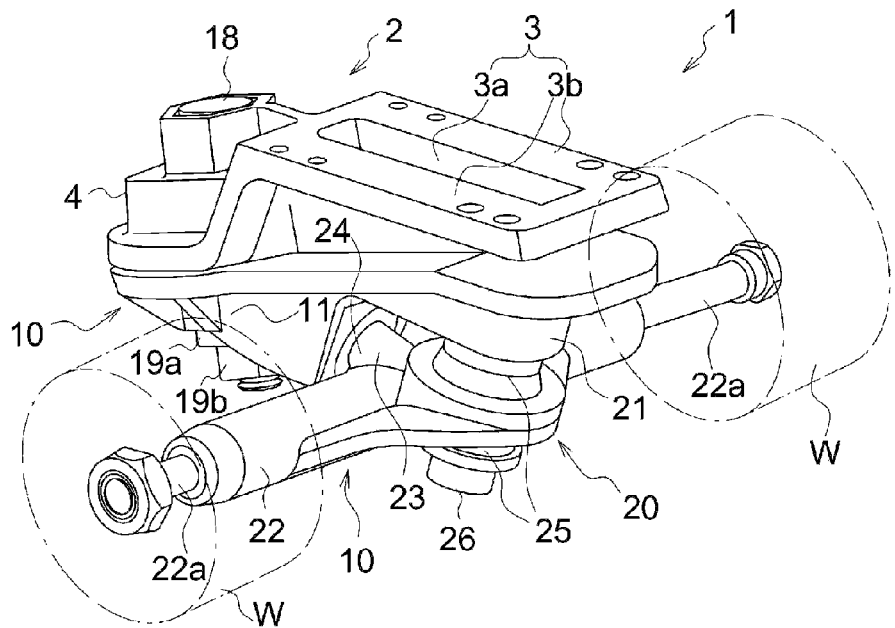
FIG. 1 is a perspective view of a track structure for a skateboard.

REFERENCE SIGNS LIST 1 track structure
2 support base
3 base section
4 bearing base section
5 bearing containing chamber
5a recess
6 through hole
6a first circular hole
6b second circular hole
6c receiving hole
7 sliding plate
8 elastic block
9 guide pin
10 rockable section
11 rotation base section
12 base section main body
13 operation section
14 through hole
15 collar
17 long hole
18 bolt
19a washer
19b nut
20 track
21 mounting section
22 main body section
25 bushing rubber
26 king pin
23 hanger
24 pivot
27 pivot hole
28 hole section
W wheel
D deck

BEST MODE FOR CARRYING OUT THE INVENTION

The present invention realized stability in a steering operation by supporting a block-shaped operation section at a neutral position with elastic blocks provided within a bearing containing chamber, by deflecting the elastic blocks capable of repulsion by means of displacement of the operation section turning integrally with a rockable section by body weight shifting so as to automatically return a steering angle to the neutral position.

Example 1

Track Structure

Example 1 of a track structure for a skateboard of this invention will be described below by referring to the attached drawings.

The track structure 1 of this example illustrated in FIGS. 1 to 8 is composed of a support base 2 fixed to a deck D and a rockable section 10 pivotally attached to the support base 2 and having a track section 20.

[Support Base]

Figure 4:
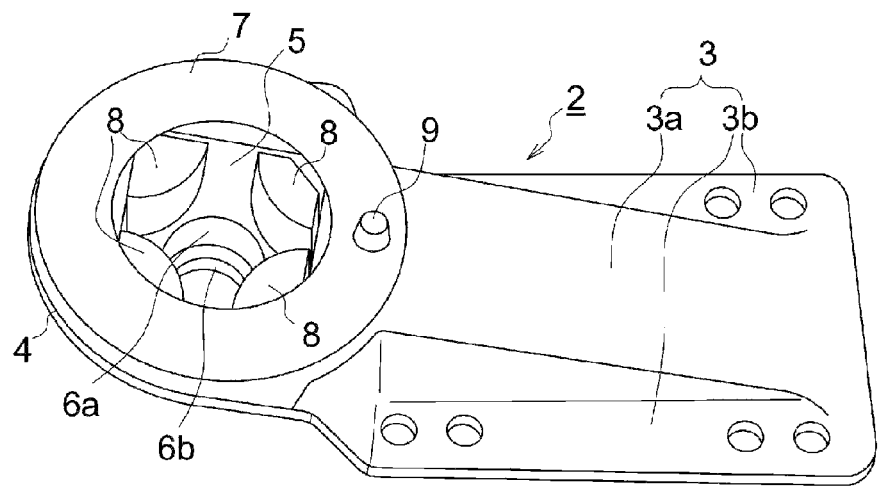
FIG. 4 is a perspective view of a support base when seen from the bottom face side.

The support base 2 is composed of a base section 3 to be fixed to the deck D and a bearing base section 4 juxtaposed with and formed integrally with the base section 3 (See FIG. 4).

[Base Section]

The base section 3 has a box-shaped main body section 3a formed on an inclined-shaped receiving face having the center thereof protruding downward and a lower face gradually inclined downward in a direction to separate from a wheel W and a flange section 3b for fixation extending to right and left at an upper end of the main body section 3a, brought into contact with the deck D without a gap and screwed thereto.

[Bearing Base Section]

Figure 3:
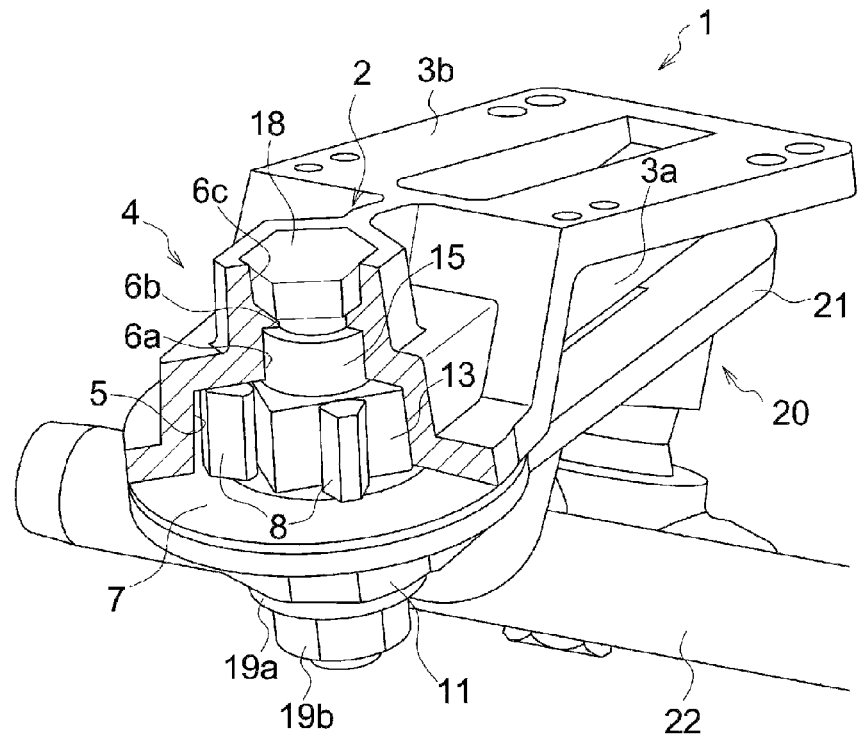
FIG. 3 is a perspective view of an essential part of a bearing base section in FIG. 1 illustrated in a section.

The bearing base section 4 is provided integrally on the distal end side (side away from the wheel W) of the base section 3 and has a bearing containing chamber 5 formed of a recess open in the lower face and a through hole 6 penetrating the upper face of the bearing base section 4 at the center of the bearing containing chamber 5 (See FIG. 3).

[Bearing Containing Chamber]

The bottom face of the bearing base section 4 has a circular shape, and a bearing containing chamber 5 having a substantially square shape open at the center thereof and recessed in the same sectional face to the middle position of the bearing base section 4 is formed.

In this Example, the bearing containing chamber 5 is formed of a square recess having a substantially square sectional face.

Moreover, the upper face of the bearing base section 4 is inclined so that the side separating from the wheel W is gradually separated from the deck D and a gap is formed.

[Through Hole]

Figure 2:
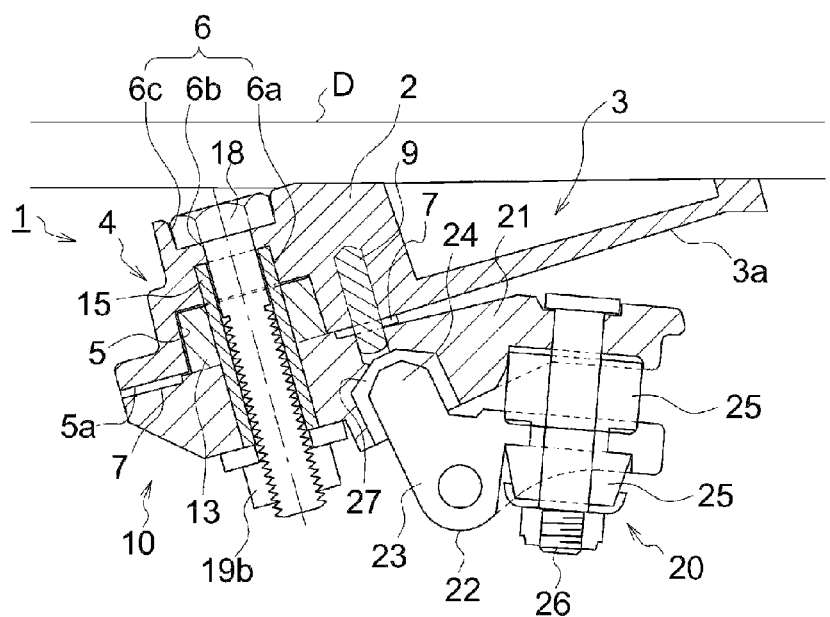
FIG. 2 is a sectional view of FIG. 1.

The through hole 6 is a hole having a small diameter drilled along the center line of the bearing containing chamber 5, and in this example, the through hole 6 has a first circular hole 6b and a second circular hole 6b set having a smaller diameter above that, both being formed in a series in an upper part of the bearing containing chamber 5, and the upper face side of the bearing base section 4 which becomes the upper part of the second circular hole 6b is set as a receiving hole 6c recessed in a recess shape (See FIGS. 2 and 3).

[Sliding Plate]

On the bottom face of the bearing base section 4, a doughnut-shaped sliding plate 7 for reducing friction when sliding is installed so as to surround the opening of the bearing containing chamber 5.

Moreover, at the center close to the base section 3 of the sliding plate 7, a guide pin 9 embedded in the support base 2 and penetrating the sliding plate 7, the distal end thereof projecting downward, is fixed.

[Rockable Section]

Subsequently, the rockable section 10 is composed of a rotation base section 11 pivotally attached in correspondence with the bearing base section 4 and the track section 20 juxtaposed with and formed integrally with the rotation base section 11.

[Rotation Base Section]

The rotation base section 11 has a base section main body 12 opposing the circular bottom face of the bearing base section 4 to the sliding plate 7, and an operation section 13 fitted in the bearing containing chamber 5 is projected on the base section main body 12.

[Operation Section]

The operation section 13 has a freely rotatable shape within the bearing containing chamber 5 and formed of a columnar block having a substantially square cross section in the illustrated example.

Figure 5:
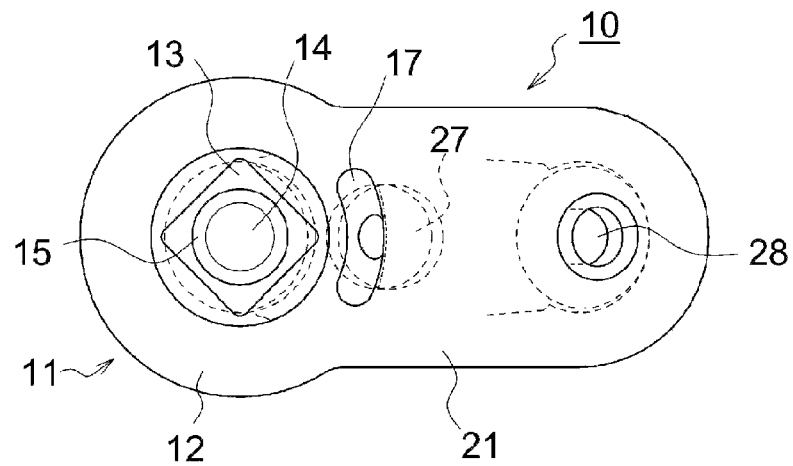
FIG. 5 is a plan view of a track section before assembly when seen from an upper face of a rockable section.
Figure 6:
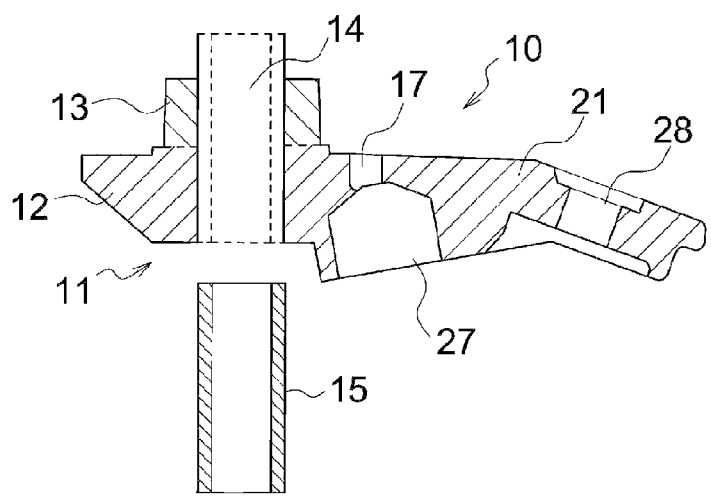
FIG. 6 is a sectional view of FIG. 5.

In this Example, since the cross sectional face of the bearing containing chamber 5 also has a substantially square shape, the operation section 13 has its length of a diagonal line of the substantially square cross section set to a length shorter than a length of one side of the substantially square cross section of the bearing containing chamber 5 (See FIGS. 5 and 6).

[Through Hole]

In this operation section 13, a through hole 14 formed of a circular hole penetrating the rotation base section 11 along the center line thereof is drilled.

This through hole 14 is set to have the same center and diameter as those of the first circular hole 6b so that it is aligned and communicates with that when the operation section 13 is fitted in the bearing containing chamber 5.

[Track Mounting Section]

The rotation base section 11 extends in the longitudinal direction and becomes a track mounting section 21 (See FIGS. 5 and 6).

The track mounting section 21 has a pivot hole 27 opened in the lower face and a hole section 28 for inserting the king pin 26, penetrating in the vertical direction.

Moreover, an arc-shaped long hole 17 into which the guide pin 9 protrudes is formed at an upper position of the pivot hole 27 on the upper part of the track mounting section 21.

[Long Hole]

The long hole 17 fits with the guide pin 9 when the rockable section 10 pivotally moves to right and left and regulates a right-and-left rotation angle of the rockable section 10 and is formed in a curved arc shape along the rotation trajectory having a length from the pivot shaft to the guide pin as a radius.

In the illustrated example, a part of the long hole 17 overlaps with the pivot hole 27 and slightly communicates therewith.

[Track Section]

The track section 20 is, as illustrated in FIG. 2, provided with a yoke 22 extending horizontally in a direction orthogonal to a traveling direction and to which wheel mounting shafts 22a are fixed at both right and left ends, and the wheel W is pivotally attached to this wheel mounting shaft rotatably with a nut and the like.

The yoke 22 is provided with a tongue-piece shaped hanger 23 projecting in the lateral direction from the side face of the yoke main body at the center thereof and is secured by a nut and a washer at the lower end while this hanger 23 is sandwiched by upper and lower bushing rubbers 25 made of an elastic body such as urethane rubber from the both upper and lower faces, the king pin 26 being inserted through a bolt hole opened at the center position of these members.

The yoke 22 is elastically supported by the king pin 26 in a state sandwiched by the bushing rubbers 25 on the both upper and lower faces.

On the other hand, a pivot 24 crossing the king pin 26 at a predetermined angle is formed on the yoke 22, and the pivot 24 is formed of a known configuration in which a distal end of this pivot 24 is inserted into the pivot hole 27 through a rubber bushing and the like so as to be pivotally supported rotatably.

[Assembling Method]

The operation section 13 of the rockable section 10 is fitted into the bearing containing chamber 4 of the support base 2 along the axis.

As a result, the through hole 14 of the rockable section 10 and the through hole 6 of the bearing base section 4 are integrally matched and communicate with each other.

By inserting a columnar collar 15 upward from the through hole 14 below into the through holes 6 and 14 made a series, an insertion end of the collar 15 is inserted to the end portion of the first circular hole 6b and hooked by a stepped portion from the second circular hole 6b, while the base end is made consistent with the lower face of the rotation base section 11.

On the other hand, a bolt 18 is inserted from the receiving hole 6c which is the upper through hole 6 to a second through hole 2b and inserted through the hollow part of the collar 15 and is made to protrude downward below the rockable section 10 by the distal end from the lower end of the through hole 14. As a result, the head portion of the bolt 18 is fitted into the receiving hole 6c.

Then, on the distal end of the protruding bolt 18, the rockable section 10 is assembled on the support base 2 by being secured by a nut 19b through a washer 19a. As a result, the operation section 13 is made capable of pivotal movement to right and left by using the collar 15 as a shaft.

[Elastic Block]

Figure 7:
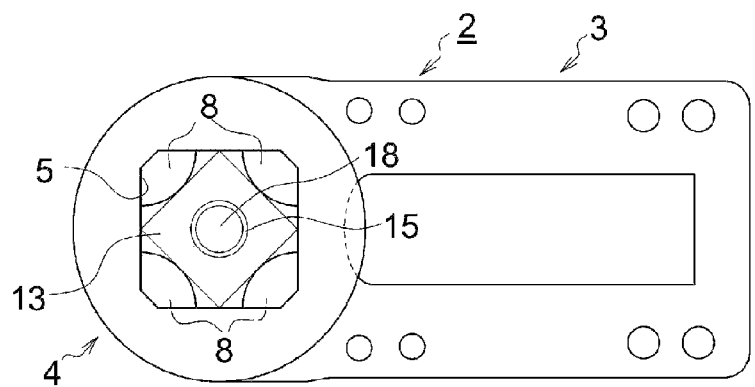
FIG. 7 is an explanatory diagram illustrating a relationship between bearing containing chamber of the support base and an operation section at a neutral position when seen from the bottom face.
Figure 8:
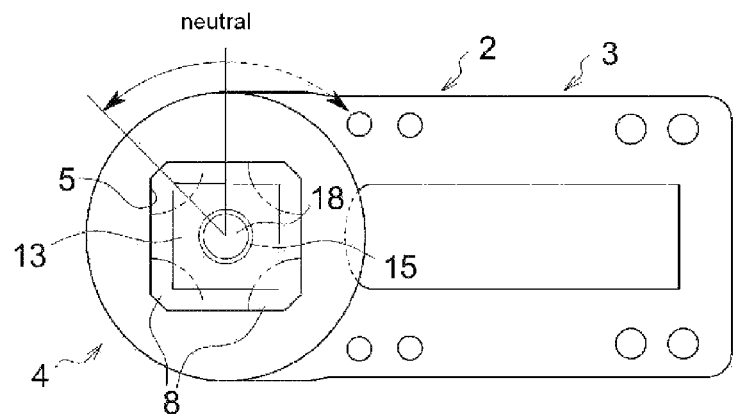
FIG. 8 is an explanatory diagram of a state being pivoted right and left of the same when seen from the bottom face.

In the bearing containing chamber 4, elastic blocks 8 made of rubber or elastomer are contained at four corners and hooked by the corner sections (See FIGS. 7 and 8).

The elastic block 8 may have any block body shape having an arbitrary sectional shape such as a cylindrical body, a columnar body having a substantially a ¼ circular section or a columnar body having a fan-shaped section as in the illustrated example.

These four elastic blocks 8 abuts the operation section 13 so that the operation section 13 stays still at the neutral position.

In this example, the operation section 13 is set at the neutral position in the attitude rotated by approximately 45 degrees with respect to the bearing containing chamber 4.

On the other hand, the elastic block 8 has a substantially fan-shaped section, and a most protruding center of the arc-shaped curved surface is configured to abut each side wall surface at the center of the operation section 13.

As a result, each of the elastic blocks 8 is arranged at equal intervals with respect to the axis.

Then, if the rockable section is rocked to right and left with respect to the longitudinal direction of the deck D by body weight shifting on the deck D, the operation section 13 integrally formed therewith is interlockingly moved to right and left, and each side wall face compresses and deflects the elastic block 8 built in the bearing containing chamber 4 in the rotating direction.

As a result, since a repulsive force in the direction opposite to the rotating direction is accumulated in each elastic block 8, if the rotating force of the operation section 13 becomes weaker than the repulsive force, the operation section 13 can be automatically returned to the neutral position by a biasing force of the elastic block 8.

Example 2

Figure 9:
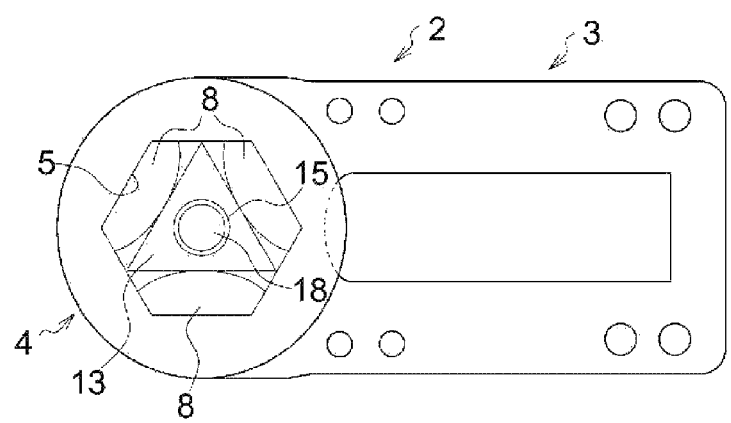
FIG. 9 is an explanatory diagram of the bearing containing chamber and the operation section at the neutral position in Example 2 when seen from the bottom face.

The track structure 1 for a skateboard illustrated in FIG. 9 shows an example with different bearing structure.

The bearing containing chamber 5 is formed of a recess portion having a substantially regular hexagonal cross section, and the operation section 13 is formed of a substantially regular triangular cross section.

The elastic block 8 is formed of a substantially hog-backed cross section hooked by two adjacent corner sections of the bearing containing chamber 5 so as to oppose the three side wall surfaces of the operation section 13, and three elastic blocks are arranged at equal intervals about the axis so that a most protruding portion in the arc-shaped distal end abuts the substantial center of the side wall surface of the operation section 13.

In this case, too, the elastic block 8 is configured to increase the repulsive force in the direction opposite to rotation with respect to the rotation of the operation section 13 and to be able to automatically return to the neutral position if the rotation force of the operation section 13 weakens.

Since the other configurations are the same as those in the above-described Example 1, the explanation will be omitted.

Example 3

Figure 10:
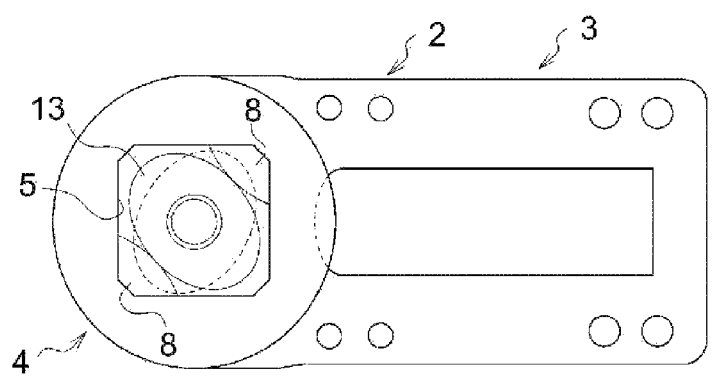
FIG. 10 is an explanatory diagram of the bearing containing chamber and the operation section at the neutral position in Example 3 when seen from the bottom face.

The track structure 1 for a skateboard in FIG. 10 illustrates still another example of the bearing structure.

The bearing containing chamber 5 is formed of a recess portion having a substantially square cross section, and the operation section 13 is formed of a substantially oval cross section.

The elastic block 8 is formed of a substantially fan-shaped cross section hooked by two corner sections arranged on the diagonal line of the bearing containing chamber 5 so as to oppose the right and left side wall surfaces in the longitudinal direction of the operation section 13, and two elastic blocks are arranged at equal intervals about the axis so that most protruding portion in the arc-shaped distal end abuts the substantial center of the side wall surface of the operation section 13.

In this case, too, the elastic block 8 is configured to increase the repulsive force in the direction opposite to rotation with respect to the rotation of the operation section 13 and to be able to automatically return to the neutral position if the rotation force of the operation section 13 weakens.

Since the other configurations are the same as those in the above-described Example 1, the explanation will be omitted.

Example 4

In the above-described Example, the elastic block 8 is described in a state where it is attached by being hooked by the corner section of the bearing containing chamber 5, but a recess 5a which becomes a corner with which an outer end of the elastic block 8 is engaged may be formed in the inner peripheral wall surface of the bearing containing chamber 5.

Figure 11:
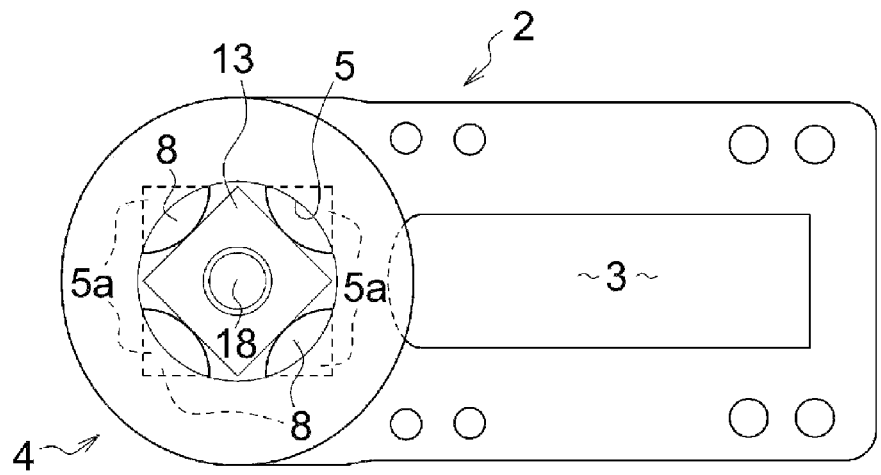
FIG. 11 is an explanatory diagram of the bearing containing chamber and the operation section at the neutral position in Example 4 when seen from the bottom face.

The bearing containing chamber 5 illustrated in FIG. 11 has an arbitrary shape or a recess portion having a circular cross section without a corner section, for example, a plurality of (4 in the illustrated example) recesses 5a which become corners are dented outward in the inner peripheral wall surface at equal intervals about the pivot shaft, and a locking section of the elastic block 8, formed in the elastic block 8 and capable of being engaged with the recesses 5a which become corners, may be fitted and locked.

Example 5

In the above-described Example, the bearing containing chamber 5 is provided in the bearing base section 4 of the support base 2, while the operation section 13 is provided in the rotation base section 11 of the rockable section 10, but the projection and recess may be reversed such that the bearing containing chamber 5 is configured to be provided in the rotation base section 11 of the rockable section 10, while the operation section 13 is provided in the bearing base section 4 of the support base 2.

Figure 12:
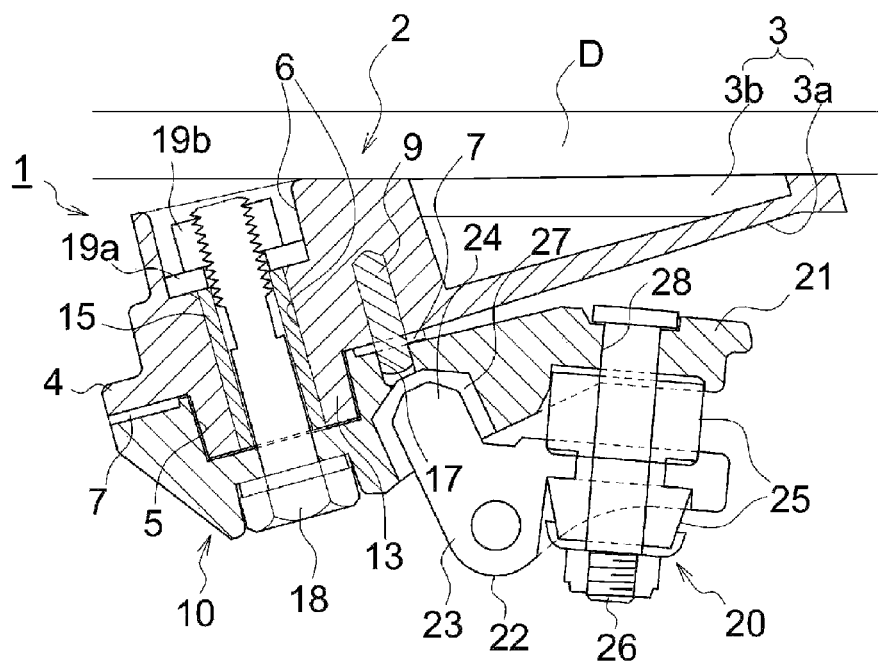
FIG. 12 is a sectional view of the track structure for a skateboard of Example 5 in which the bearing containing chamber is provided in the rockable section, and the operation section is provided on the bearing base section.

The track structure 1 illustrated in FIG. 12 illustrates an example in which the direction of the bolt 18 is also opposite to that in Example 1, but the direction of the bolt 18 may be the same as that in Example 1.

Since the other configurations are the same as those in the above-described Examples 1 to 4, the explanation will be omitted.

In each of the above-described Examples, the track section is integrally formed with the rockable section, but it may be so configured that a support plate for the track section is provided in the rockable section and the separated and independent track section is detachably fastened to the support plate.

This invention is not limited to each of the above-described Examples but it is needless to say that various design changes are possible within a range not changing the gist of this invention.

The invention claimed is:

1. A track structure for a skateboard composed of a support base which is fixed to a deck and a rockable section pivotally attached to the support base and having a track section and provided with a pivotable attachment section which supports the rockable section turnable from a neutral position of the track section to right and left and also biases the rockable section capable of returning to the neutral position, comprising:
   a bearing containing chamber having a pivotable attachment section composed of a recess which is formed in one of the support base or the rockable section and which is open toward the other;
   an operation section formed on the other of said support base or the rockable section and rotatably fitted in said bearing containing chamber and composed of a columnar block;
   a pivot shaft section for rotatably supporting, within the bearing containing chamber, the operation section; and
   elastic blocks hooked by a plurality of corner sections formed within said bearing containing chamber, capable of replacement, arranged in plural at equal intervals about the axis of the pivot shaft section, wherein
   a most protruding center of the arc-shape formed on the distal end facing said operation section of each of the elastic blocks is arranged to abut each side wall surface of the operation section at the center at the neutral position of said operation section;
   the plurality of elastic blocks hold said operation section at the neutral position and, when the operation section pivots to right and left from the neutral position, bias the operation section in a direction in which the operation section returns to the neutral position by deflecting the elastic blocks, capable of repulsion, and
   wherein
   said bearing containing chamber is formed of a recess having a substantially square-shaped cross section or a recess having a substantially hexagonal cross section;
   the operation section has a cross sectional shape of a substantially square, a substantially triangle or a substantially oval shape;
   the elastic block is formed of a cylindrical body, a columnar body having a substantially ¼ circular section, a substantially fan-shaped cross section or a hog-backed columnar body; and
   each of the elastic blocks is arranged so that an arc-shaped most protruding portion on a distal end thereof abuts a substantial center of each side wall surface of said operation section and holds said operation section at a neutral position and, when the operation section pivots to right and left, biases the operation section in a direction to return the operation section to the neutral position.

2. The track structure for a skateboard according to claim 1, wherein the support base is formed of a base section to be fixed to a deck by screwing and a bearing base section juxtaposed with and formed integrally with the base section, and the bearing containing chamber formed of a recess open in the lower face of the bearing base section and a through hole through which a pivot shaft section penetrates in the upper face of the bearing base section at the center the bearing containing chamber.

3. The track structure for a skateboard according to claim 2, wherein the rockable section is composed of a rotation base section pivotally attached to the bearing base section and the track section juxtaposed with and formed integrally with the rotation base section, said rotation base section has an operation section fitted with the bearing containing chamber projected, and a through hole is provided penetrating the rotation base section along a center line of the operation section, aligned with the through hole of the bearing containing chamber and capable of inserting the pivot shaft section between the support base and the rockable section.

4. The track structure for a skateboard according to claim 3, wherein the bearing containing chamber is formed of a recess having a polygonal cross section, and an elastic block is hooked by one or a plurality of corner sections of the bearing containing chamber.

5. The track structure for a skateboard according to claim 3, wherein the elastic block projects to the pivot shaft section side, a distal end thereof abuts the substantial center of a side wall surface of the operation section at a neutral position, and if the operation section turns to right or left, it presses and deflects the elastic block in the rotation direction so that a repulsive force is made to act in a rotation direction opposite to the rotation direction.

6. The track structure for a skateboard according to claim 3, wherein a guide pin having a distal end projecting downward is fixed to the support base, an arc-shaped long hole opened above and fitted with the distal end of said guide pin is formed in the upper face of the rockable section, and said long hole is curved along a rotation trajectory having a length from the pivot shaft to the guide pin as a radius.

7. The track structure for a skateboard according to claim 2, wherein the bearing containing chamber is formed of a recess having a polygonal cross section, and an elastic block is hooked by one or a plurality of corner sections of the bearing containing chamber.

8. The track structure for a skateboard according to claim 2, wherein the elastic block projects to the pivot shaft section side, a distal end thereof abuts the substantial center of a side wall surface of the operation section at a neutral position, and if the operation section turns to right or left, it presses and deflects the elastic block in the rotation direction so that a repulsive force is made to act in a rotation direction opposite to the rotation direction.

9. The track structure for a skateboard according to claim 2, wherein a guide pin having a distal end projecting downward is fixed to the support base, an arc-shaped long hole opened above and fitted with the distal end of said guide pin is formed in the upper face of the rockable section, and said long hole is curved along a rotation trajectory having a length from the pivot shaft to the guide pin as a radius.

10. The track structure for a skateboard according to claim 1, wherein the bearing containing chamber is formed of a recess having a polygonal cross section, and an elastic block is hooked by one or a plurality of corner sections of the bearing containing chamber.

11. The track structure for a skateboard according to claim 10, wherein the elastic block projects to the pivot shaft section side, a distal end thereof abuts the substantial center of a side wall surface of the operation section at a neutral position, and if the operation section turns to right or left, it presses and deflects the elastic block in the rotation direction so that a repulsive force is made to act in a rotation direction opposite to the rotation direction.

12. The track structure for a skateboard according to claim 10, wherein a guide pin having a distal end projecting downward is fixed to the support base, an arc-shaped long hole opened above and fitted with the distal end of said guide pin is formed in the upper face of the rockable section, and said long hole is curved along a rotation trajectory having a length from the pivot shaft to the guide pin as a radius.

13. The track structure for a skateboard according to claim 1, wherein the elastic block projects to the pivot shaft section side, a distal end thereof abuts the substantial center of a side wall surface of the operation section at a neutral position, and if the operation section turns to right or left, it presses and deflects the elastic block in the rotation direction so that a repulsive force is made to act in a rotation direction opposite to the rotation direction.

14. The track structure for a skateboard according to claim 13, wherein a guide pin having a distal end projecting downward is fixed to the support base, an arc-shaped long hole opened above and fitted with the distal end of said guide pin is formed in the upper face of the rockable section, and said long hole is curved along a rotation trajectory having a length from the pivot shaft to the guide pin as a radius.

15. The track structure for a skateboard according to claim 1, wherein a guide pin having a distal end projecting downward is fixed to the support base, an arc-shaped long hole opened above and fitted with the distal end of said guide pin is formed in the upper face of the rockable section, and said long hole is curved along a rotation trajectory having a length from the pivot shaft to the guide pin as a radius.

* * * * *